US012095615B2

(12) United States Patent
Sastry et al.

(10) Patent No.: US 12,095,615 B2
(45) Date of Patent: Sep. 17, 2024

(54) SECURITY / AUTOMATION SYSTEM WITH ROUTER FUNCTIONALITY

(71) Applicant: Johnson Controls Tyco IP Holdings LLP, Milwaukee, WI (US)

(72) Inventors: Anand Sastry, Los Altos Hills, CA (US); Ross Werner, San Francisco, CA (US); David Pulling, San Jose, CA (US)

(73) Assignee: Tyco Fire & Security GmbH, Schaffhausen (CH)

( * ) Notice: Subject to any disclaimer, the term of this patent is extended or adjusted under 35 U.S.C. 154(b) by 0 days.

(21) Appl. No.: 17/459,648

(22) Filed: Aug. 27, 2021

(65) Prior Publication Data

US 2023/0068422 A1  Mar. 2, 2023

(51) Int. Cl.
H04L 41/082 (2022.01)
H04L 9/40 (2022.01)

(52) U.S. Cl.
CPC ............ H04L 41/082 (2013.01); H04L 63/20 (2013.01)

(58) Field of Classification Search
CPC ............ H04L 41/082; H04L 63/20; H04L 2012/2841; H04L 12/2809; H04L 67/125; H04L 12/2803; H04L 41/0806; H04L 61/1511; H04L 67/02; H04L 67/025; H04L 67/10; H04L 12/2818; H04L 2012/2843; H04L 41/0813; H04L 41/12; H04L 63/0428; H04L 63/10; H04L 12/2807; H04L 12/2825; H04L 12/2834; H04L 12/4625; H04L 12/4633; H04L 12/4641; H04L 41/0816; H04L 41/22; H04L 41/5041; H04L 61/2514; H04L 63/0236; H04L 63/0272; H04L 63/0281; H04L 63/083; H04L 63/102; H04L 67/1097; H04L 67/12; H04L 67/32; H04L 67/36; H04L 69/18; H04L 12/2816; H04L 2012/2849; H04L 2012/285; H04L 2209/805; H04L 29/08936; H04L 41/0213; H04L 41/022; H04L 41/0253; H04L 41/06; H04L 41/08; H04L 41/0859;

(Continued)

(56) References Cited

U.S. PATENT DOCUMENTS 10,062,245 B2 * 8/2018 Fulker ................. H04L 12/2818
10,785,104 B1 * 9/2020 Maloney ................. H04L 63/10
(Continued)

FOREIGN PATENT DOCUMENTS

WO   2020206453 A1   10/2020

OTHER PUBLICATIONS

Extended European Search Report in EP22165182.1, mailed Sep. 21, 2022, 7 pages.
(Continued)

Primary Examiner — Greg C Bengzon
(74) Attorney, Agent, or Firm — ArentFox Schiff LLP

(57) ABSTRACT

Example implementations include a method, apparatus, and computer-readable medium comprising receiving, by a control panel of a security or automation system of a premises, an indication of an update in a configuration of a router that is configured to support an Internet protocol "IP" network at the premises; and updating the configuration of the router by the control panel in response to receiving the indication.

16 Claims, 4 Drawing Sheets

(58) Field of Classification Search
CPC .............. H04L 41/0879; H04L 41/0886; H04L 41/0893; H04L 41/14; H04L 41/20; H04L 41/28; H04L 41/5064; H04L 41/5077; H04L 43/045; H04L 43/08; H04L 43/0811; H04L 43/0817; H04L 43/0864; H04L 43/0894; H04L 45/24; H04L 49/15; H04L 49/70; H04L 61/2007; H04L 61/2015; H04L 61/6009; H04L 61/6013; H04L 61/6022; H04L 61/6063; H04L 63/0227; H04L 63/0245; H04L 63/0254; H04L 63/0263; H04L 63/029; H04L 63/0464; H04L 63/0815; H04L 63/0823; H04L 63/0853; H04L 63/0861; H04L 63/0876; H04L 63/101; H04L 63/1483; H04L 63/166; H04L 63/168; H04L 65/1033; H04L 65/1036; H04L 65/105; H04L 65/1073; H04L 65/4084; H04L 65/80; H04L 67/141; H04L 67/145; H04L 67/16; H04L 67/18; H04L 67/22; H04L 67/26; H04L 67/2809; H04L 67/2814; H04L 67/306; H04L 69/32; H04L 9/0838; H04L 9/3213; H04L 9/3226; H04L 9/3268; H04W 12/08; H04W 84/12; H04W 4/80; H04W 12/04; H04W 12/35; H04W 4/50; H04W 4/70; H04W 4/90; H04W 8/18; H04W 8/186; H04W 8/20; H04W 8/205; H04W 12/03; H04W 12/06; H04W 12/068; H04W 12/104; H04W 12/37; H04W 12/48; H04W 12/71; H04W 12/73; H04W 24/02; H04W 24/08; H04W 28/24; H04W 4/024; H04W 4/025; H04W 4/21; H04W 4/38; H04W 4/40; H04W 40/34; H04W 48/08; H04W 48/20; H04W 76/10; H04W 76/11; H04W 76/12; H04W 8/06; H04W 84/042; H04W 88/16; G06F 3/04817; G06F 21/602; G06F 3/0482; G06F 3/04842; G06F 3/0488; G06F 9/45558; G06F 16/954; G06F 16/972; G06F 2009/45587; G06F 2009/45595; G06F 21/45; G06F 21/6218; G06F 21/6263; G06F 21/78; G06F 2221/2117; G06F 2221/2141; G06F 2221/2149; G06F 3/0484; G06F 3/0604; G06F 3/0605; G06F 3/0622; G06F 3/0637; G06F 3/0659; G06F 3/0665; G06F 3/067; G06F 3/167; G06F 9/00

See application file for complete search history.

(56) References Cited

U.S. PATENT DOCUMENTS

| | | | |
|---|---|---|---|
| 11,317,272 B2* | 4/2022 | Ceccarelli | H04W 28/24 |
| 2012/0017012 A1* | 1/2012 | Bartholomay | H04L 41/5041 |
| | | | 718/1 |
| 2012/0203877 A1* | 8/2012 | Bartholomay | G06F 9/45558 |
| | | | 709/221 |
| 2015/0043377 A1* | 2/2015 | Cholas | H04W 48/08 |
| | | | 370/254 |
| 2015/0263891 A1* | 9/2015 | Baugher | H04L 41/5041 |
| | | | 370/254 |
| 2016/0330078 A1* | 11/2016 | Bostick | H04W 12/08 |
| 2017/0208039 A1* | 7/2017 | Godfrey | G06F 9/00 |
| 2017/0214584 A1* | 7/2017 | Kanojia | H04L 67/145 |
| 2018/0007054 A1* | 1/2018 | Els | H04L 61/2514 |
| 2018/0302375 A1* | 10/2018 | Els | H04L 67/32 |
| 2018/0338241 A1* | 11/2018 | Li | H04W 12/08 |
| 2020/0034622 A1* | 1/2020 | Thakurta | G06V 40/20 |
| 2020/0187004 A1* | 6/2020 | Reimer | H04W 12/068 |
| 2020/0278813 A1* | 9/2020 | Nilsson | G06F 3/0605 |
| 2020/0344270 A1* | 10/2020 | Nilsson | G06F 9/45558 |
| 2020/0344602 A1* | 10/2020 | Li | H04L 67/125 |
| 2021/0142601 A1* | 5/2021 | Schoenfelder | G07C 9/00571 |
| 2021/0250349 A1* | 8/2021 | Konda | H04L 63/083 |
| 2021/0250763 A1* | 8/2021 | Wright | G06F 8/65 |
| 2022/0028249 A1* | 1/2022 | Saldin | H04L 67/125 |
| 2022/0057917 A1* | 2/2022 | Fulker | H04L 12/2809 |
| 2022/0078229 A1* | 3/2022 | Kitchen | H04L 12/2834 |

OTHER PUBLICATIONS

FRITZ!Box 7490 Installation and Operation, AVM International, Aug. 2014. Retrieved from the Internet: <URL:https://assets.avm.de/files/docs/fritzbox/fritzbox-7490/fritzbox-7490_man_en_GB.pdf>, 196 pages.

* cited by examiner

SECURITY / AUTOMATION SYSTEM WITH ROUTER FUNCTIONALITY

FIELD

The present disclosure relates generally to router configuration systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method comprising receiving, by a control panel of a security or automation system of a premises, an indication of an update in a configuration of a router that is configured to support an Internet protocol "IP" network at the premises. The method further comprises updating the configuration of the router by the control panel in response to receiving the indication.

Another example implementation includes an apparatus comprising a memory comprising instructions, and a processor communicatively coupled with the memory. The processor is configured to execute the instructions to receive, by a control panel of a security or automation system of a premises, an indication of an update in a configuration of a router that is configured to support an Internet protocol "IP" network at the premises. The processor is further configured to execute the instructions to update the configuration of the router by the control panel in response to receiving the indication.

Another example implementation includes an apparatus comprising means for receiving, by a control panel of a security or automation system of a premises, an indication of an update in a configuration of a router that is configured to support an Internet protocol "IP" network at the premises. The apparatus further comprises means for updating the configuration of the router by the control panel in response to receiving the indication.

Another example implementation includes a computer-readable medium storing instructions executable by a processor, wherein the instructions, when executed, cause the processor to receive, by a control panel of a security or automation system of a premises, an indication of an update in a configuration of a router that is configured to support an Internet protocol "IP" network at the premises. The instructions, when executed, further cause the processor to update the configuration of the router by the control panel in response to receiving the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
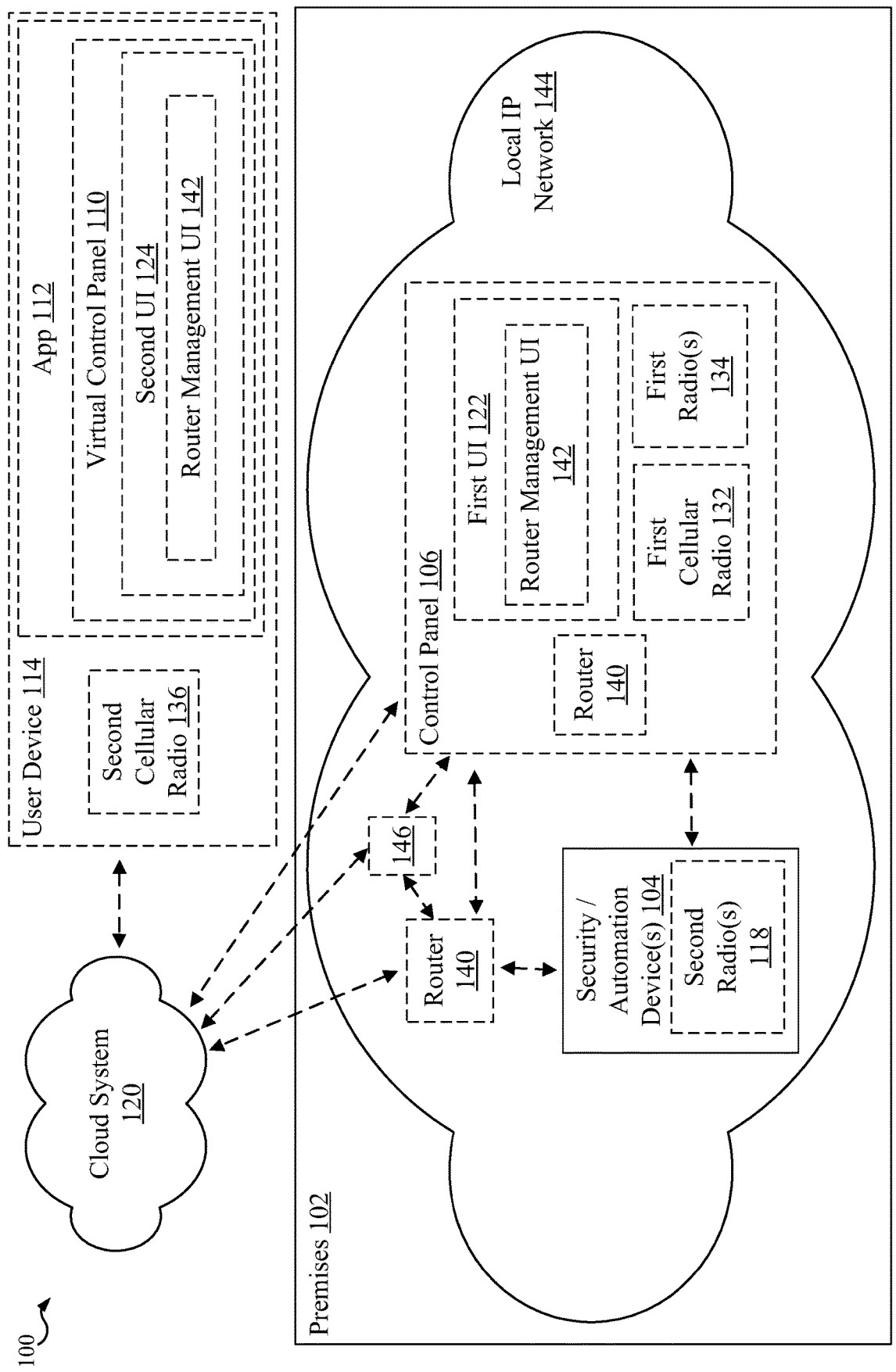
FIG. 1 is a schematic diagram of an example security/automation system configured for providing router functionality, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Some present aspects provide a security/automation system that includes integrated router management functionality such as, but not limited to, router configuration management. In some aspects, for example, a security/automation system control panel positioned/installed at a premises may allow for managing the configuration of a router that supports Internet connectivity at that premises. For example, a user interface of the control panel may be operable to provide a router management interface for configuring the router and/or a local Internet protocol (IP) network supported by the router at the premises. In some alternative or additional aspects, a cellular radio at the control panel may allow for a remote management system (e.g., a cloud system) to remotely connect to (or communicatively couple with) the control panel and manage the configuration of the router and/or the local IP network supported by the router at the premises. In some aspects, the router may be separate from the control panel, in which case the control panel may be operable to communicate with the router either wirelessly (e.g., according to the Wireless Fidelity (Wi-Fi) protocol) or via a wired connection (e.g., an Ethernet connection). In some alternative aspects, the control panel may include the router.

In some alternative or additional aspects, router management functionality may be provided via a component that is separate from the control panel of the security/automation system. For example, a dedicated device positioned at the premises may be operable to communicate with the router either wirelessly or via a wired connection, and the dedicated device may include a cellular radio and be operable to allow for a remote management system to remotely connect to (or communicatively couple with) the dedicated device via the cellular radio to manage the configuration of the router and/or the local IP network supported by the router at the premises.

In some other alternative or additional aspects, a user interface of a virtual control panel on a user device (e.g., a personal computer, a mobile device, etc.) may be operable to provide a router management interface for configuring the router and/or the local IP network supported by the router at the premises. For example, the user device may be operable to communicate with a cloud system (e.g., via a wired or wireless network, including but not limited to a cellular network), where the cloud system is in communication with the control panel positioned at the premises, and where the control panel is in communication with the router at the premises. Alternatively, the user device may be operable to communicate with the cloud system, where the cloud system is in communication with the dedicated device positioned at the premises, and where the dedicated device is in communication with the router at the premises. Accordingly, a user may use the router management interface on the virtual control panel on the user device to configure the router and/or the local IP network supported by the router at the premises.

In further alternative aspects, a router at a premises may be configured to provide at least some security/automation functionality at the premises. For example, a router at a premises may include one or more radios (e.g., Bluetooth, PowerG, Z-Wave, etc.) for communicating with one or more security/automation devices at the premises. In these aspects, the router may also include a cellular radio and may be operable to allow for a remote management system (e.g., a cloud system) to remotely connect to (or communicatively couple with) the router via the cellular radio to manage the configuration of the router and/or a local IP network supported by the router at the premises.

Turning now to the figures, example aspects are depicted with reference to one or more components described herein, where components in dashed lines may be optional.

Referring to FIG. 1, in one non-limiting aspect, for example, a router 140 at a premises 102 may be configured to interface an Internet Service Provider (ISP) via a modem to provide Internet connectivity over a local IP network 144 at the premises 102 (e.g., via Ethernet and/or Wi-Fi communication). The local IP network 144 supported by the router 140 may provide Internet connectivity for a control panel 106 of a security/automation system 100 at the premises 102, as well as Internet connectivity for various security/automation devices 104 (e.g., cameras, door/window sensors, motion sensors, carbon monoxide detectors, smoke detectors, flood sensors, etc.) that are installed/positioned throughout the premises 102, and/or any other devices at the premises 102 (e.g., personal computers, mobile devices, wearable devices, etc.).

In alternative aspects, the router 140 may be separate from the control panel 106 or may be included within the control panel 106.

In an aspect, the control panel 106 may communicate with at least some of the security/automation devices 104 using one or more first radios 134 (e.g., Bluetooth, PowerG, Z-Wave, etc.) in the control panel 106 and corresponding second radios 118 in the security/automation devices 104, or using another wired or wireless connection, e.g., via a physical Ethernet connection. For example, the control panel 106 may include a chipset (e.g., a Qualcomm Snapdragon chipset) that is configured to connect to the Internet via a Wi-Fi network (e.g., the local IP network 144) and/or a cellular network. The chipset may include multiple radios for cellular communication and/or for communication with premises security sensors/devices and/or premises automation sensors/devices. For example, in an aspect, the chipset may include a cellular radio as well as one or more other radios for Bluetooth, PowerG, Z-Wave, etc. In an aspect, the sensors/devices of the security/automation system may be wired or wireless, and may include, for example, one or more cameras, door/window sensors, motion sensors, carbon monoxide detectors, smoke detectors, flood sensors, etc.

In some aspects, the router 140 may be configurable and/or controllable via a first user interface (UI) 122 of the control panel 106, for example, via a router management UI 142 presentable on the control panel 106.

In some aspects, the control panel 106 may include a first cellular radio 132 for external communications. For example, the control panel 106 may use the first cellular radio 132 for communicating directly (e.g., via a cellular network) with a remote security/automation management system, such as a cloud system 120 that supports the security/automation system 100 at the premises 102, to allow for remote configuration management of the router 140 from the cloud system 120.

In some aspects, the control panel 106 may provide an integrated router management UI 142 for a customer at the premises 102, and may also provide router management via a direct connection to the cloud system 120.

In some alternative or additional aspects, the router 140 may be configured and/or controlled via a second UI 124 of a virtual control panel 110 provided via an application (app) 112 executing on a user device 114 (e.g., a mobile device). In some aspects, the user device 114 may include a second cellular radio 136 for communicating directly (e.g., via a cellular network) with the cloud system 120 to manage or control the router 140 at the premises 102, for example, via the router management UI 142 presentable on the user device 114. However, the present aspects are not so limited, and the user device 114 may communicate with the cloud system 120 via any other wired or wireless network/connection.

In some alternative or additional aspects, the router management hardware of the security/automation system 100 may be configured as a dedicated device 146 that is separate from the control panel 106 of the security/automation system 100. In some non-limiting aspects, for example, the dedicated device 146 may include an enclosure (e.g., a box) that encloses hardware, software, and/or firmware components. In these aspects, the router 140 may be configurable and/or controllable via the dedicated device 146. The dedicated device 146 may include a cellular radio (not shown) as well as a wired interface (e.g., Ethernet) or a wireless interface (e.g., Wi-Fi) with the local IP network 144 at the premises 102. The dedicated device 146 may use the cellular radio for communicating directly with the cloud system 120 for configuring the router 140. Accordingly, the router 140 may be configured from the cloud system 120 via the dedicated device 146. In an aspect, by connecting to the cloud system 120, the dedicated device 146 may allow for the router 140 to be configured on the router management UI 142 on the user device 114 via the cloud system 120. The dedicated device 146 may also be operable to communicate with the control panel 106 (e.g., via a wired or wireless connection at the premises 102), in which case the router 140 may alternatively or additionally be configurable via the router management UI 142 on the control panel 106 at the premises 102.

Accordingly, unlike conventional systems in which a personal computer or another computer device is used to connect to a specific IP address that provides a management interface (e.g., a web browser-based interface) for configuring a router, in some present aspects, a physical or virtual security/automation system control panel (or a dedicated device separate from the control panel) provides an interface to the router for performing any configuration changes or other changes to the router.

Additionally, the present aspects allow for seamless configuration of a router of a premises by a dealer/provider of a security/automation system of the premises.

In an aspect, the cloud system 120 may communicate with the control panel 106 via the first cellular radio 132 to configure the router 140 and/or the local IP network 144 supported by the router 140 at the premises 102 via the control panel 106. For example, the cloud system 120 may configure a service set identifier (SSID), a Wi-Fi network ID, or a Wi-Fi network password for the local IP network 144, configure assignment of IP addresses over the local IP network 144, configure parental control over the local IP network 144, etc. The cloud system 120 may also communicate with the control panel 106 via the first cellular radio 132 to configure the control panel 106 and/or other security/automation devices 104 of the security/automation system 100 for communication over the local IP network 144 according to the new configuration of the local IP network 144. For example, in an aspect, the control panel 106 may use one or more first radios 134 (configured according to a protocol such as, e.g., PowerG, Z-wave, etc.) to wirelessly communicate with associated security/automation devices 104, and may also include interfaces to connect to wired sensors (e.g., Ethernet). Using such radios/interfaces, the control panel 106 may configure the security/automation devices 104 of the security/automation system 100 for communication over the local IP network 144 according to any new/updated configuration of the router 140 and/or the local IP network 144.

In one non-limiting aspect, for example, when the ISP of the premises 102 changes (e.g., when the customer of the security/automation system 100 switches from one ISP to another ISP), the cloud system 120 may communicate with the control panel 106 via the first cellular radio 132 to configure the router 140 for working with the new ISP. For example, the cloud system 120 may update a password for the local IP network 144. The cloud system 120 may also communicate with the control panel 106 via the first cellular radio 132 to configure the control panel 106 and/or other security/automation devices 104 (e.g., cameras, door/window sensors, motion sensors, carbon monoxide detectors, smoke detectors, flood sensors, etc.) of the security/automation system 100 for communication over the local IP network 144 using the new password.

In an alternative non-limiting aspect, for example, when the ISP of the premises 102 changes, the cloud system 120 may communicate with the dedicated device 146 via a cellular radio of the dedicated device 146 to configure the router 140 for working with the new ISP.

In another alternative non-limiting aspect, for example, when the ISP of the premises 102 changes, a user at the premises 102 may use the router management UI 142 on the control panel 106 to configure the router 140 for working with the new ISP.

In another alternative non-limiting aspect, for example, when the ISP of the premises 102 changes, a user may use the router management UI 142 on the virtual control panel 110 to configure the router 140 for working with the new ISP.

In some alternative or additional aspects, the cloud system 120 may communicate with the control panel 106 via the first cellular radio 132 to update the configuration of the router 140 or the local IP network 144 in order to improve the security of the security/automation system 100. For example, the cloud system 120 may communicate with the control panel 106 via the first cellular radio 132 to periodically (e.g., every month, every six months, etc.) update a password for the local IP network 144 in order to improve the security of the security/automation system 100, and the control panel 106 may also communicate with security/automation devices 104 at the premises 102 to configure them with the new password of the local IP network 144.

Figure 2:
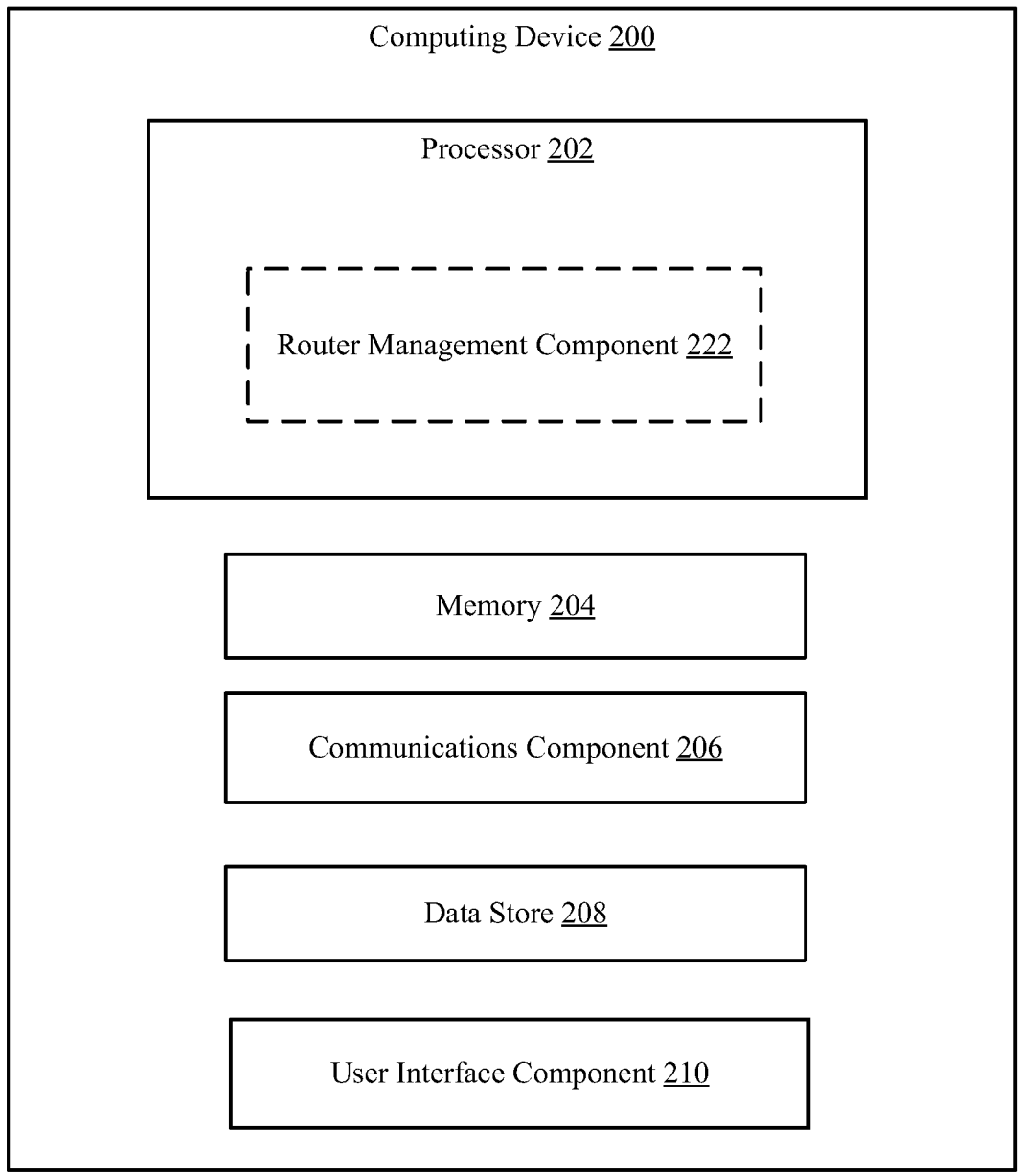
FIG. 2 is a block diagram of an example computing device which may implement all or a portion of any component or device in FIG. 1, according to some aspects.

FIG. 2 illustrates an example block diagram providing details of computing components in a computing device 200 that may implement all or a portion of one or more components in a control panel, a cloud system, a security/automation sensor or device, a user device (e.g., a smartphone, a tablet, a laptop computer, a desktop computer, etc.), a dedicated device, or any other component described above. The computing device 200 includes a processor 202 which may be configured to execute or implement software, hardware, and/or firmware modules that perform any functionality described above with reference to one or more components in a control panel, a cloud system, a security/automation sensor or device, a user device, a dedicated device, or any other component described above. For example, the processor 202 may be configured to execute a router management component 222 to provide router management functionality as described herein with reference to various aspects.

The processor 202 may be a micro-controller and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, flash drives, magnetic discs, optical discs, volatile memory, non-volatile memory (e.g., a non-transitory computer-readable medium storing instructions executable by the processor 202), and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc., utilizing hardware, software, and services. The communications component 206 may carry communications between components on the computing device 200, as well as between the computing device 200 and external devices, such as devices located across a communications network and/or devices serially or locally connected to the computing device 200. For example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by the processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
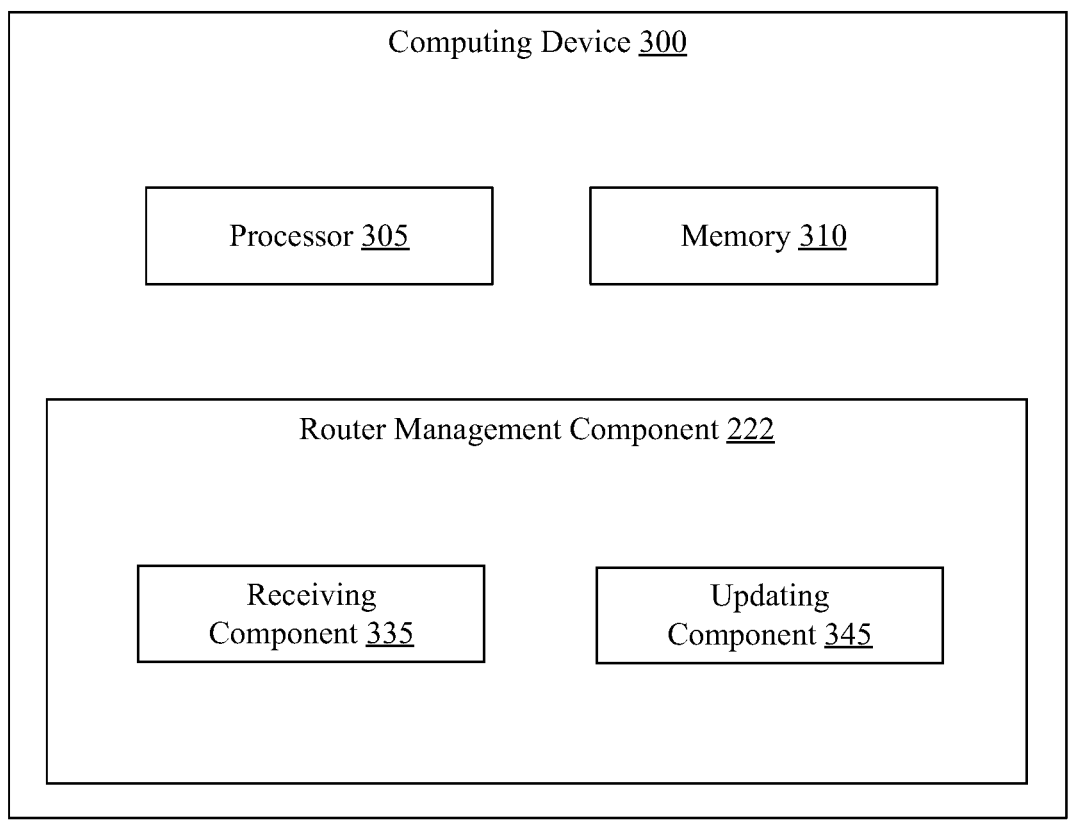
FIG. 3 is a block diagram of example components of a computing device which may implement all or a portion of a device configured for providing router functionality, according to some aspects.
Figure 4:
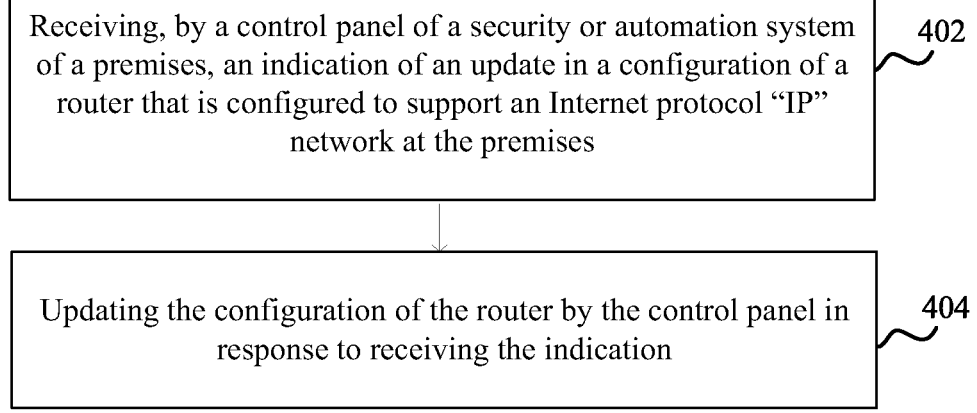
FIG. 4 is a flow diagram of an example method for providing router functionality, according to some aspects.

Referring to FIG. 3 and FIG. 4, in operation for router management functionality, computing device 300 may implement at least a portion of one or more components in FIGS. 1 and 2 above, such as all or at least a portion of control panel 106, virtual control panel 110, app 112, user device 114, cloud system 120, router 140, dedicated device 146, or any other component configured for providing router management functionality. In this case, the computing device 300 may perform method 400 such as via execution of router management component 222, receiving component 335, and/or updating component 345, by processor 305 and/or memory 310. Specifically, computing device 300 may be configured to perform method 400 for performing an aspect of router management functionality, as described herein. It should be noted that computing device 300, processor 305, and memory 310 may be the same or similar to computing device 200, processor 202, and memory 204 as described above with respect to FIG. 2.

At block 402, the method 400 includes receiving, by a control panel of a security or automation system of a premises, an indication of an update in a configuration of a router that is configured to support an Internet protocol "IP" network at the premises. For example, in an aspect, computing device 300, processor 305, memory 310, router management component 222, and/or receiving component 335 may be configured to or may comprise means for receiving, by a control panel of a security or automation system of a premises, an indication of an update in a configuration of a router that is configured to support an Internet protocol "IP" network at the premises.

For example, the receiving at block 402 may include the control panel 106 of the security/automation system 100 of the premises 102 executing the receiving component 335 to receive an indication of an update in a configuration of the router 144 that is configured to support the local IP network 144 at the premises 102. Alternatively, in another example, the dedicated device 146 may execute the receiving component 335 to receive an indication of an update in a configuration of the router 144 that is configured to support the local IP network 144 at the premises 102. Alternatively, in another example, the virtual control panel 110 may execute the receiving component 335 to receive an indication of an update in a configuration of the router 144 that is configured to support the local IP network 144 at the premises 102.

At block 404, the method 400 includes updating the configuration of the router by the control panel in response to receiving the indication. For example, in an aspect, computing device 300, processor 305, memory 310, router management component 222, and/or updating component 345 may be configured to or may comprise means for updating the configuration of the router by the control panel in response to receiving the indication.

For example, the updating at block 404 may include the control panel 106 of the security/automation system 100 of the premises 102 executing the updating component 345 to update the configuration of the router 140 in response to the indication received at block 402.

In one non-limiting implementation, the control panel is positioned at the premises. For example, the indication received at block 402 for updating the configuration of the router 140 may be received by the control panel 106 which is located/installed at the premises 102.

In one non-limiting implementation, the router is separate from the control panel, wherein the updating comprises communicating by the control panel with the router. For example, the indication received at block 402 for updating the configuration of the router 140 may be received by the control panel 106 which is located/installed at the premises 102 and is separate from the router 140.

In one non-limiting implementation, the control panel includes the router. For example, the indication received at block 402 for updating the configuration of the router 140 may be received by the control panel 106 which is located/installed at the premises 102 and includes the router 140.

In one non-limiting implementation, the receiving comprises receiving the indication via a user interface of the control panel. For example, the indication received at block 402 for updating the configuration of the router 140 may be received via the router management UI 142 of the control panel 106 which is located/installed at the premises 102. For example, a customer/user at the premises 102 may use the router management UI 142 of the control panel 106 to update the configuration of the router 140 at the premises 102.

In one non-limiting implementation, the control panel comprises a cellular radio, wherein the receiving comprises receiving the indication from a cloud system over a cellular connection between the control panel and the cloud system, wherein the cloud system is configured to support the security or automation system of the premises. For example, the control panel 106 which is located/installed at the premises 102 may include the first cellular radio 132, and the indication received at block 402 for updating the configuration of the router 140 may be received by the control panel 106 over a cellular connection between the control panel 106 and the cloud system 120 that supports the security/automation system 100 of the premises 102.

In one non-limiting implementation, the control panel comprises a virtual control panel implemented as a cloud-based application executable on a user device. For example, the virtual control panel 110 which runs on the user device 114 may receive the indication for updating the configuration of the router 140 via the router management UI 142 on the virtual control panel 110. For example, a user may use the router management UI 142 on the virtual control panel 110 of the user device 114 to update the configuration of the router 140 at the premises 102.

In one non-limiting implementation, the updating comprises communicating the indication by the virtual control panel to a cloud system configured to support the security or automation system of the premises. For example, when the virtual control panel 110 which runs on the user device 114 receives the indication for updating the configuration of the router 140 via the router management UI 142 on the virtual control panel 110, the virtual control panel 110 may communicate the indication to the cloud system 120 in order to effect the updating of the configuration of the router 140 at the premises 102.

In one non-limiting implementation, the cloud system is configured to communicate the indication to a device at the premises over a cellular connection. For example, when the cloud system 120 receives the indication for updating of the configuration of the router 140 from the virtual control panel 110, the cloud system 120 communicates the indication to a device (e.g., the control panel 106 or the dedicated device 146) at the premises 102 in order to effect the updating of the configuration of the router 140 at the premises 102.

In one non-limiting implementation, the device is configured to update the router according to the indication. For example, when the cloud system 120 communicates the indication for updating of the configuration of the router 140 to a device (e.g., the control panel 106 or the dedicated device 146) at the premises 102 in order to effect the updating of the configuration of the router 140 at the premises, the device (e.g., the control panel 106 or the dedicated device 146) updates the router 140 according to the indication received from the cloud system 120.

In one non-limiting implementation, the device comprises another control panel of the security or automation system of the premises, wherein the another control panel is positioned at the premises and is configured to communicate with the router. For example, when the cloud system 120 receives the indication for updating of the configuration of the router 140 from the virtual control panel 110, the cloud system 120 may communicate the indication for updating of the configuration of the router 140 to the control panel 106 at the premises 102.

In one non-limiting implementation, the another control panel comprises a cellular radio for communication with the cloud system. For example, when the cloud system 120 receives the indication for updating of the configuration of the router 140 from the virtual control panel 110, the cloud system 120 may use a cellular connection to communicate the indication for updating of the configuration of the router 140 to the control panel 106 that includes the first cellular radio 132.

In one non-limiting implementation, the update comprises an SSID update on the router 140.

In one non-limiting implementation, the update comprises an ISP update on the router 140.

In one non-limiting implementation, the update comprises a network password update of the local IP network 144 at the premises 102.

In one non-limiting implementation, the update comprises a parental control update over the local IP network 144 at the premises 102.

In one non-limiting implementation, the router 140 includes the control panel 106. For example, the router 140 may be configured to provide at least some premises security/automation functionality at the premises 102.

In one non-limiting implementation, the router 140 includes at least one radio (e.g., Bluetooth, PowerG, Z-Wave, etc.) configured to communicate with one or more security/automation devices 104 in the security/automation system 100 of the premises 102. For example, the router 140 may include at least one radio (e.g., Bluetooth, PowerG, Z-Wave, etc.) to communicate with one or more security/automation devices 104 to provide at least some premises security/automation functionality at the premises 102.

Some further example aspects are provided below.

1. A method comprising:
    receiving, by a control panel of a security or automation system of a premises, an indication of an update in a configuration of a router that is configured to support an Internet protocol "IP" network at the premises; and
    updating the configuration of the router by the control panel in response to receiving the indication.

2. The method of clause 1, wherein the control panel is positioned at the premises.

3. The method of clauses 1 or 2, wherein the router is separate from the control panel, wherein the updating comprises communicating by the control panel with the router.

4. The method of clauses 1 or 2, wherein the control panel includes the router.

5. The method of any of clauses 1-4, wherein the receiving comprises receiving the indication via a user interface of the control panel.

6. The method of any of clauses 1-5, wherein the control panel comprises a cellular radio, wherein the receiving comprises receiving the indication from a cloud system over a cellular connection between the control panel and the cloud system, wherein the cloud system is configured to support the security or automation system of the premises.

7. The method of clause 1, wherein the control panel comprises a virtual control panel implemented as a cloud-based application executable on a user device.

8. The method of clauses 1 or 7, wherein the updating comprises communicating the indication by the virtual control panel to a cloud system configured to support the security or automation system of the premises.

9. The method of any of clauses 1, 7, or 8, wherein the cloud system is configured to communicate the indication to a device at the premises over a cellular connection.

10. The method of any of clauses 1 or 7-9, wherein the device is configured to update the router according to the indication.

11. The method of any of clauses 1 or 7-10, wherein the device comprises another control panel of the security or automation system of the premises, wherein the another control panel is positioned at the premises and is configured to communicate with the router.

12. The method of any of clauses 1 or 7-11, wherein the another control panel comprises a cellular radio for communication with the cloud system.

13. The method of any of clauses 1-12, wherein the update comprises an SSID update on the router.

14. The method of any of clauses 1-13, wherein the update comprises an ISP update on the router.

15. The method of any of clauses 1-14, wherein the update comprises a network password update of the IP network at the premises.

16. The method of any of clauses 1-15, wherein the update comprises a parental control update over the IP network at the premises.

17. The method of any of clauses 1 or 2, wherein the router includes the control panel.

18. The method of any of clauses 1, 2, or 3, wherein the router includes at least one radio configured to communicate with one or more security or automation devices in the security or automation system of the premises.

An apparatus comprising:
a memory; and
a processor communicatively coupled with the memory and configured to perform the method of any of the above clauses.

A non-transitory computer-readable medium storing instructions executable by a processor that, when executed, cause the processor to perform the method of any of the above clauses.

An apparatus comprising means for performing the method of any of the above clauses.

A system comprising:
a memory; and
a processor communicatively coupled with the memory and configured to perform the method of any of the above clauses.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
   presenting, by a user interface (UI) of a control panel that is positioned at a premises and is configured to control one or more security or automation devices of a security or automation system of the premises, a router management UI that is operable to receive a user input for configuring a router that is included in the control panel;
   receiving, by the router management UI, the user input from a user at the premises, the user input comprising an indication of an update in a configuration of the router that is included in the control panel, wherein the router is configured to support an Internet protocol (IP) network at the premises, wherein the one or more security or automation devices of the security or automation system of the premises communicate over the IP network supported by the router; and
   configuring the router by the control panel in response to receiving the user input comprising the indication of the update in the configuration of the router.

2. The method of claim 1, wherein the update comprises a service set identifier (SSID) update on the router.

3. The method of claim 1, wherein the update comprises an Internet Service Provider (ISP) update on the router.

4. The method of claim 1, wherein the update comprises a network password update of the IP network at the premises.

5. The method of claim 1, wherein the update comprises a parental control update over the IP network at the premises.

6. The method of claim 1, wherein the router management UI is further configured for configuring the IP network that is supported by the router.

7. The method of claim 1, wherein the router that is included in the control panel is configured to interface an Internet Service Provider (ISP) via a modem to provide Internet connectivity over the IP network at the premises.

8. The method of claim 1, wherein the IP network that is supported by the router of the control panel is configured to provide Internet connectivity for the control panel.

9. The method of claim 1, wherein the IP network that is supported by the router of the control panel is configured to provide Internet connectivity for the one or more security or automation devices that are controllable by the control panel.

10. The method of claim 1, wherein the router management UI excludes a web browser-based interface.

11. A system comprising:
    a memory; and
    a processor communicatively coupled with the memory and configured to:
    present, by a user interface (UI) of a control panel that is positioned at a premises and is configured to control one or more security or automation devices of a security or automation system of the premises, a router management UI that is operable to receive a user input for configuring a router that is included in the control panel;
    receive, by the router management UI, the user input from a user at the premises, the user input comprising an indication of an update in a configuration of the router that is included in the control panel, wherein the router is configured to support an Internet protocol (IP) network at the premises, wherein the one or more security or automation devices of the security or automation system of the premises communicate over the IP network supported by the router; and
    configure the router by the control panel in response to receiving the user input comprising the indication of the update in the configuration of the router.

12. A non-transitory computer-readable medium storing instructions executable by a processor, wherein the instructions, when executed, cause the processor to:
    present, by a user interface (UI) of a control panel that is positioned at a premises and is configured to control one or more security or automation devices of a security or automation system of the premises, a router management UI that is operable to receive a user input for configuring a router that is included in the control panel;

receive, by the router management UI, the user input from a user at the premises, the user input comprising an indication of an update in a configuration of the router that is included in the control panel, wherein the router is configured to support an Internet protocol (IP) network at the premises, wherein the one or more security or automation devices of the security or automation system of the premises communicate over the IP network supported by the router; and configure the router by the control panel in response to receiving the user input comprising the indication of the update in the configuration of the router.

13. A control panel positioned at a premises and configured to control one or more security or automation devices of a security or automation system of the premises, the control panel comprising:

a router configured to support an Internet protocol (IP) network at the premises, wherein the IP network is configured to provide Internet connectivity for the control panel and for the one or more security or automation devices of the security or automation system of the premises; and a user interface (UI) configured on the control panel and operable for presenting a router management UI that is operable for receiving a user input from a user at the premises for configuring the router by the control panel.

14. The control panel of claim 13, wherein the router management UI is further configured for configuring the IP network that is supported by the router that is included in the control panel.

15. The control panel of claim 13, further comprising one or more radios configured for communicating with the one or more security or automation devices.

16. The control panel of claim 13, further comprising a cellular radio configured for communicating with a cloud system that is configured to support the security or automation system of the premises.

* * * * *